United States Patent [19]

Nichols

[11] Patent Number: 4,632,943

[45] Date of Patent: Dec. 30, 1986

[54] POLYURETHANE FOAMS PREPARED FROM ALKYL DIALKANOL AMINE-CONTAINING POLYOLS

[75] Inventor: Jerram B. Nichols, Alvin, Tex.

[73] Assignee: Dow Chemical Company, Freeport, Tex.

[21] Appl. No.: 725,608

[22] Filed: Apr. 22, 1985

Related U.S. Application Data

[63] Continuation-in-part of Ser. No. 643,594, Aug. 23, 1984, abandoned.

[51] Int. Cl.$^4$ .................. C08G 18/14; C08G 18/32
[52] U.S. Cl. ........................... 521/129; 252/182; 521/167
[58] Field of Search ................. 521/167, 129; 252/182

[56] References Cited

U.S. PATENT DOCUMENTS

| | | | |
|---|---|---|---|
| 3,476,933 | 11/1969 | Mendelsohn | 260/2.5 |
| 3,655,588 | 4/1972 | Mosso et al. | 521/167 |
| 3,888,803 | 6/1975 | Doerge et al. | 521/167 |
| 3,890,255 | 6/1975 | van Leuwen et al. | 521/167 |
| 4,067,833 | 1/1978 | Austin et al. | 260/2.5 AQ |
| 4,145,318 | 3/1979 | Ohashi et al. | 521/167 |
| 4,220,732 | 9/1980 | McBrayer | 521/167 |
| 4,339,343 | 7/1982 | Koehler et al. | 521/167 |
| 4,388,420 | 6/1983 | McBrayer | 521/167 |

FOREIGN PATENT DOCUMENTS

| | | | |
|---|---|---|---|
| 2251889 | 10/1972 | Fed. Rep. of Germany | 521/167 |
| 981135 | 1/1965 | United Kingdom | 521/167 |

*Primary Examiner*—Herbert S. Cockeram

[57] ABSTRACT

Polyurethane foams are prepared by reacting a polyisocyanate and a polyahl in the presence of water and a dialkanol tertiary amine. The foams are rigid, useful for thermal insulation in roofs, walls, refrigerators, etc., and are capable of filling mold space completely on foaming (good flowability) without shrinking excessively.

17 Claims, No Drawings

POLYURETHANE FOAMS PREPARED FROM ALKYL DIALKANOL AMINE-CONTAINING POLYOLS

CROSS REFERENCE TO RELATED APPLICATION

This is a continuation-in-part of Application Ser. No. 643,594 which was filed Aug. 23, 1984 and now abandoned.

This invention relates to polyurethane foams, and to a polyahl composition for the production of polyurethane foams, especially rigid foams.

Rigid polyurethane foams are commonly used for thermal insulation in refrigerators, freezers, roofs, walls, and the like. These polyurethane foams are often preferred over other types of insulation due to their ability to be formed in situ by reacting and foaming a polyurethane reaction mixture in the space where insulation is desired. The resulting rigid foam exhibits good thermal insulation properties (sometimes expressed as a low K factor) and often provides some structural support as well.

Because of the manner in which such foams are prepared, it is important that the foaming reaction mixture be capable of completely filling the available space before the polymerization reaction is completed. The ability of the reaction mixture to fill a mold is generally referred to as "flowability". It is generally desirable that the reaction mixture exhibit good flowability. However, it is often difficult to obtain good flowability in the preparation of polyurethane and/or polyurea foam.

To improve the flowability of the foaming reaction mixture it is known to incorporate small amounts of water into the polyol. The water, however, causes the resulting rigid foam to have generally poorer insulating properties. In addition, the compressive strength of the foam is often worsened by having water in the polyol. Thus, the practitioner has often been forced to choose between having good insulation capacity and strength on the one hand, or good flowability on the other.

In addition to having good flowability, the foam prepared from the reaction mixture advantageously exhibits little shrinkage upon curing and subsequent cooling. In commercial practice, it is often necessary to use a greater amount of the reaction mixture than is theoretically required to fill a mold in order to prevent subsequent foam shrinkage at cold temperatures. This excess amount is often expressed as "percent packing", this ratio of the excess required to prevent shrinking at low temperatures to the minimum amount of reaction mixture required to barely fill the mold. It is obviously beneficial to reduce the percent packing, as this reduces the quantity of raw materials required.

It would be desirable to provide a polyol composition which provides good flowability to the foaming reaction mixture and which also produces, upon reaction with a polyisocyanate, a polyurethane and/or polyurea foam with good thermal insulating properties. It is further desirable to provide a foam requiring a small percent packing. In addition, it would be desirable to provide a rigid polyurethane foam which also has good compressive strength.

SUMMARY OF THE INVENTION

This invention is an improvement in a method for preparing a polyurethane foam. The method comprises reacting a polyisocyanate and an active hydrogen-containing composition comprising a polyahl and a minor amount of water. The improvement which is this invention comprises employing in the active hydrogen containing composition a dialkanol tertiary amine in an amount such that the flowability of a foaming reaction mixture prepared from the active hydrogen-containing composition is improved, and such that the isocyanate-reactive materials present in such active hydrogen containing composition have an average functionality of at least about 3.0.

In another aspect, this invention is an active hydrogen-containing composition comprising (a) at least one compound which is not a dialkanol tertiary amine, having an average of at least 3.0 active hydrogen atoms per molecule (referred to herein as a polyahl)

(b) a minor amount of water and (c) a dialkanol tertiary amine, in an amount sufficient to improve the flowability of a foaming reaction mixture prepared from the active hydrogen-containing composition, and such that the isocyanate-reactive materials present in said active hydrogen-containing composition have an average functionality of at least about 3.0.

The active hydrogen-containing composition of the invention, when reacted with a polyisocyanate to form a rigid polyurethane foam, provides a foam having a K-factor which is comparable or lower than those obtained with previously known foam formulations which do not contain the dialkanol amine. In addition, the compressive strength of rigid foams prepared according to the invention is generally equal or superior to those prepared according to previously known methods. Thus, with this invention, the practitioner is not forced to trade off strength or insulation capacity for flowability. This invention further provides for a low percent packing.

DETAILED DESCRIPTION OF THE INVENTION

In this invention, a dialkanol tertiary amine is used in an active hydrogen-containing composition which comprises a polyahl and water. The dialkanol tertiary amine used in this invention contains a tertiary nitrogen atom to which are attached two aliphatic hydroxyl groups. This dialkanol tertiary amine is represented by the structure

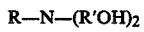

wherein R is an inertly substituted organic radical and each R' is independently an inertly substituted alkylene, alkyl ether or poly(alkylether) radical. By "inertly substituted," it is meant that the moiety referred to contains no substituent group which reacts with or adversely interferes with the reaction of the active hydrogen containing composition and the polyisocyanate to form a polyurethane foam.

The group R is advantageously an alkyl, cycloalkyl, aryl, aralkyl, alkyl ether, alkyl terminated poly(oxyalkylene) or like group. Suitable alkyl groups include those having from about 1–22 carbon atoms, including both linear and branched species. Such alkyl group may contain cycloalkyl or aryl substituent groups, as well as sites of unsaturation and inert substituent groups such as halogen, ether, tertiary amine and the like. Preferably, the alkyl group contains from about 1-8, more preferably 1-4 carbon atoms.

Suitable cycloalkyl groups include those having from about 4-8 carbon atoms in the ring, including cyclobutyl, cyclopentyl, cyclohexyl, cycloheptyl and cyclooctyl groups. The ring may contain inert substituents such as alkyl, halogen or alkoxy groups as well as sites of unsaturation.

Suitable aryl groups include phenyl, naphthyl, tolyl, xylyl, methylnaphthy, and like groups as well as those containing various inert substituents such as halogen, alkyl, alkoxyl and the like.

Suitable aralkyl groups include benzyl, naphthylmethylene, tolyl methylene and the like as well as those containing inert substituents such as halogen, alkyl, alkoxyl and the like.

Suitable alkylether and organic-terminated poly(oxyalkylene) groups include methoxyethylene, ethoxyethylene, methoxy-2-methyl ethylene, ethoxy-2-methyl ethylene, $CH_3(OC_2H_4)_2—$, $C_2H_5(OC_2H_4)_2—$ and the like.

The R' group is advantageously alkylene, inertly substituted alkylene, alkyl ether or polyoxyalkylene having from about 2-12, preferably 2-4 carbon atoms. The R' group may be straight chained or branched. Preferred as the R' group are alkylene radicals, especially ethylene, 2-methyl ethylene and 2-ethyl ethylene radicals, with the 1 carbon atom being that attached to the nitrogen atom.

Exemplary dialkanol tertiary amines suitable herein include methyl diethanol amine, ethyl diethanol amine, isopropyl diethanol amine, n-propyl diethanol amine, n-, iso-, or t-butyl diethanol amine, methyl di(2-isopropanol) amine, ethyl di(2-isopropanol) amine, isopropyl 2-di(2-isopropanol) amine, cycohexyl diethanol amine, cyclohexyl di(2-isopropanol) amine, phenyl diethanol amine, phenyl di(2-isopropanol) amine, benzyl diethanol amine, benzyl di(2-isopropanol) amine and the like. Preferred are the diverse di(ethanol) tertiary amine, especialy the alkyl diethanol amine, and most preferably methyl diethanol amine.

Also suitable as the dialkanol tertiary amine are the reaction products of a primary amine and from about 2-20, preferably about 2-6 moles of an alkylene oxide.

The dialkanol tertiary amine is present in an amount sufficient to improve the flowability of a foaming reaction mixture prepared with the active hydrogen-containing composition and a polyisocyanate. In addition, the amount of the dialkanol tertiary amine is such that an active hydrogen-containing composition containing same has an average functionality (based on the isocyanate-reactive materials therein) of at least 3.0. Generally the dialkanol tertiary amine is a minor component of the active hydrogen containing composition. Advantageously the dialkanol tertiary amine is used in an amount from about 3-40 percent, preferably 3-20%, more preferably 3-15% by weight of the polyahl(s) contained in the active hydrogen-containing composition.

"Flowability" is a term used to express the ability of a reacting polyahl-polyisocyanate mixture to expand and fill a mold. This property is quite important for "foamed in place" foams, where the ability of a foaming mixture to completely fill its container, which may be complexly shaped, is critical. The ability of the reacting mixture to fill a mold depends on several factors, including the relative rates of the polymerization reaction and the evolution of gases in the mixture, the viscosity and density of the reactants, the amount of crosslinkages formed in the reaction, and the like. Flowability is measured by injecting a premixed polyahl mixture and polyisocyanate into a 6'6"×8"×2" mold at 125°±5° C. An amount of the reactants is chosen such that, upon expanding, it just fills the mold, (i.e. about 0% packing). The mold is held in a vertical position (i.e. 6'6" rise direction) and the foaming polymer is allowed to expand against its own weight in the mold. After the foam has risen and reacted, the density of the foam is measured to determine flowability. A lower density indicates better flowability. In this invention, flowability is generally improved by about 2-40%, preferably about 5-20% compared to a like foam prepared in the absence of the dialkanol tertiary amine.

The active hydrogen containing composition of this invention contains at least one compound which is not a dialkanol tertiary amine having three or more active hydrogen atoms. For the purpose of this invention, the term "polyahl" refers to a moiety containing at least two hydrogen atoms which, because of their position in the molecule, display significant activity according to the Zerewitnoff test described by Woller in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls incude polyols, polyamines, polyamides, polymercaptans and polyacids. In general, polyols and polyamines are preferred. Polyols are most preferred. It is noted that when a polyamine is used herein, its reaction with a polyisocyanate results in the formation of a urea linkage. The terms "urethane" and "polyurethane," as used herein, incude those reaction products of a polyisocyanate with any of the polyahls described herein.

The polyahl employed may have any equivalent weight and any number of active hydrogen atoms which is suitable for preparing a foam having the desired properties, provided that the average functionality of the isocyanate-reactive materials in the active hydrogen containing composition is at least 3.0. The production of flexible foams is generally favored by using a relatively high equivalent weight polyahl and/or one having relatively few active hydrogen atoms per molecule. To produce a flexible foam, a polyahl having an equivalent weight from about 500-5,000, preferably 1000-3000 is advantageously employed. Such polyahl also most advantageously has an average of about 3-4 active hydrogen atoms per molecule.

This invention is generally most advantageous in the production of rigid polyurethane foams, and a polyahl which gives rise to such a rigid foam is preferred.

The formation of rigid polyurethane foams is generally favored by the use of a relatively low equivalent weight polyahl having at least 3 active hydrogens. To prepare rigid foams, at least a portion of the polyahl used advantageously has a hydroxyl equivalent weight from about 50-300, preferably, about 70-200, more preferably about 70-150. This low equivalent weight polyahl also preferably contains at least 3 active hydrogens and more preferably 4-8 active hydrogens. Generally, when such low equivalent weight polyahl, or a polyahl having at least three active hydrogens is used, it comprises at least about 50%, preferably 60-95% by weight of the polyahls employed in the active hydrogen-containing composition.

In addition, or alternatively, difunctional and/or high equivalent weight polyahls can be used in the preparation of rigid foams. Preferably, however, such difunctional and/or higher equivalent weight polyahls comprise a minor portion, preferably 50% or less, more preferably 5-40%, most preferaby 5-15% of the combined weight of the polyahls, and the average functionality of the isocyanate-reactive materials in the reaction mixture must be at least about 3.0.

Suitable polyahls include polyether polyols, polyester polyols, polyhydroxyl-containing phosphorous compounds, hydroxyl-terminated acetal resins, hydroxyl terminated amines and polyamines, the corresponding amine-terminated polyether and/or polyester polyols, the so called polymer or copolymer polyols which comprise a dispersion of an addition polymer as copolymer in a continuous polyahl phase, as well as other active hydrogen-containing compounds which are known to be useful in the preparation of urethane polymers. Examples of these and other suitable polyahls are described more fully in U.S. Pat. No. 4,394,491, particularly in columns 3-5 thereof. Suitable copolymer polyols include those described in U.S. Pat. No. Re 29,118 and Re 28,715 and 4,394,491.

Most preferred for preparing rigid foams, on the basis of performance, availability and cost, is a polyether polyol prepared by adding an alkylene oxide to an initiator having from 3-8, preferably 4-8 hydroxyl-groups. Exemplary such polyether polyols include those commercially available under the trade names Voranol 202, Voranol 360, Voranol 370, Voranol 446, Voranol 490, Voranol 575, Voranol 800, sold by The Dow Chemical Company, and Pluracol 824, sold by BASF Wyandotte.

Water is another critical component of the active hydrogen-containing composition. The water is necessary to improve the flowability of the foaming reaction mixture and also reacts with isocyanate groups to generate carbon dioxide. In the past, the use of water has caused the resulting polyurethane foam to have less than desirable compressive strength and/or higher K factor. Due to the use of the dialkanol tertiary amine herein, such problems are minimized or overcome.

Water is generally a minor component of the active hydrogen containing composition, and is used in an amount sufficient to improve the flowability of a foaming reaction mixture prepared from the active hydrogen containing composition and a polyisocyanate. Advantageously, from about 0.1-5, preferably 1-4, more preferably 1-3 parts by weight water are used per part of polyahl.

Optionally, but preferably, an auxilliary blowing agent in addition to water is also present in the active hydrogen-containing composition of the invention. Suitable blowing agents include inert gases, low boiling organic compounds and other compounds which evolve a gas under the conditions of the reaction between the polyahl and a polyisocyanate. Preferably, the blowing agent is a low-boiling organic compound, especially a halogenated hydrocarbon such as a fluorocarbon. Most preferred for preparing rigid foams, due to their suitable boiling temperatures, are fluorocarbons such as tetrafluoromethane, trifluorochloromethane, dichlorodifluoromethane and the like. Such fluorocarbons also remain in the cells of rigid polyurethane foam and contribute to the insulating properties thereof. Methylene chloride is preferred in preparing flexible foams. The blowing agent, along with the water, is used to provide a cellular structure to the foam, and is used in an amount sufficient for this purpose. Advantageously, from 5-100, preferably 20-60 parts of blowing agent are present per 100 parts by weight of polyahl.

In addition to the foregoing components, the active hydrogen-containing composition may optionally contain such conventional additives such as surfactants, catalysts for the polymerization (chain extension) and blowing (foaming) reactions as described hereinafter, pigments, fillers, flame retardants, stabilizers and the like.

As mentioned hereinbefore, the active hydrogen containing composition has an average functionality of at least about 3.0. The average functionality is based on the isocyanate-reactive components in the composition including the polyahl, water and the dialkanol tertiary amine. The term "functionality" refers to the number of active hydrogens per molecule of isocyanate reactive material. When the average functionality is below about 3.0, the cured foam prepared therefrom tends to shrink at cold temperatures. This shrinkage is conventionally overcome by filling the mold with an excess of reactants over that minimally necessary to fill the mold. The excess which is necessary to prevent this shrinkage is often referred to as "percent packing". It has been found that when the average functionality of the active hydrogen-containing composition is less than 3.0, the percent packing is unacceptably high. In other words, a lower functionality tends to increase shrinkage in the foam at lower temperatures. Thus, this invention provides for a desirably low percent packing, as well as excellent flowability and K-factor.

In the improved process of this invention, a rigid polyurethane foam is prepared by reacting a polyahl as described hereinbefore with a polyisocyanate in the presence of water and a dialkanol tertiary amine in the amounts described hereinbefore. The conditions and procedures employed are those conventionally employed in making rigid polyurethane foams. Suitable conditions and procedures are disclosed in U.S. Pat. No. RE 24,514.

Although each of the foregoing components may be added separately to the reaction mixture, it is normally preferred to add them in as few streams as possible. It is normal practice to combine all of the components except the polyisocyanate together and add them in a single stream.

Organic polyisocyanates which may be employed include aromatic, aliphatic and cycloaliphatic polyisocyanates and combinations thereof. Representative of these types are diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-diphenyl diisocyanate, and 3,3'-dimethyldiphenylpropane-4,4', 4'-diisocyanate; the triisocyanate polymethylene polyphenylisocyanate and tolylene-2,4,6-triisocyanate; and the tetraisocyanates such as 4,4'-dimethyldiphenylmethane-2,2', 5,5'-tetraisocyanate and the like.

A crude polyisocyanate may also be used in the practice of the present invention, such as the crude toluene diisocyanate obtained by the phosgenation of a mixture of toluene diamines or the crude diphenylmethylene diisocyanate obtained by the phosgenation of crude diphenylmethylenediamine. The preferred undistilled or crude isocyanates are disclosed in U.S. Pat. No. 3,215,652.

Especially preferred are methylene bridged polyphenylpolyisocyanates, due to their ability to crosslink the polyurethane. The isocyanate index (ratio of equivalents of isocyanates to equivalents of active hydrogens) is advantageously from about 0.90–10, preferably about 1.0–4.0, and more preferably 1.0–1.25.

The urethane reaction of a polyisocyanate with the active hydrogen containing composition is advantageously carried out in the presence of an amount of urethane-type catalyst which is effective to catalyze the reaction of the polyahl with the polyisocyanate. Preferably, the amount of urethane catalyst is that amount conventionally used in conventional urethane-type reactions. It is noted that the dialkanol tertiary amine itself exhibits catalytic activity, and may effect the amount of other catalyst needed.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408. A catalyst for the trimerization of polyisocyanates, such as an alkali metal alkoxide, may also optionally be employed herein.

A wetting agent(s) or surface-active agent(s) is generally necessary for production of high grade polyurethane foam according to the present invention, since in the absence of same, the foams collapse or contain very large, uneven sized cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred include polyethylene glycol ethers of long chain alcohols, tertiary amine or alkylolamine salts of long chain alkyl acid sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE 1

An active-hydrogen containing composition according to this invention (Sample No. 1) is prepared by mixing together the following ingredients:

| | Parts by Weight |
|---|---|
| Voranol* 370[1] | 88.5 |
| Polyglycol P-1200[2] | 11.5 |
| Water | 3.0 |
| Surfactant[3] | 1.75 |
| Dimethylcyclohexyl amine | 1.9 |
| Methyl diethanol amine | 15.0 |
| Dibutyltindilaurate | 0.08 |
| Freon 11[4] | 23% by weight of polyols |
| Average functionality | plus polyisocyanate 3.07 |

[1] A poly(propylene oxide) polyol having 6–7 functionalities and an equivalent weight of about 150.
[2] A 1200 molecular weight polypropylene glycol.
[3] A liquid organosilicone surfactant.
[4] Trichloromonofluoromethane.

This composition is reacted with a methylene-bridged polyphenyl polyisocyanate (commercially available under the brand name Rubinate M) at a 1.05 isocyanate index. The reactants are mixed and delivered on a Martin-Sweet Flex 30 foam machine. The temperature of each reactant is 70° F. The throughput of foam is 29 lb/min.

Flowability is measured according to the procedure described hereinbefore. A portion of the polymer is injected into a 2'×2'×2" panel mold which is preheated to 140° F. The polymer is allowed to rise and fill the mold. The resulting foam is evaluated for density, compressive strength (in parallel and perpendicular to rise directions) abrasion loss and K factor. The results are reported in Table I following.

For comparison, an active hydrogen-containing composition like that used to prepare Sample No. 1, except that it contains no dialkanol tertiary amine, is prepared and used to make a polyurethane foam in the same manner as Sample No. 1. The properties of this foam, designated Sample No. C-1, are reported in Table I following.

TABLE I

| | Sample No. 1 | Sample No. C-1* |
|---|---|---|
| Density, pcf (kg/m³) | 1.73 (27.71) | 1.70 (27.23) |
| Compressive Strength, psi (kPa) | | |
| perpendicular direction | 12.19 (84.05) | 8.50 (59.37) |
| parallel direction | 18.94 (130.59) | 14.13 (97.42) |
| Abrasion, wt. loss (%) | 1.5 | 6.6 |
| Flowability, pcf (kg/m³) | 1.40 (22.43) | 1.73 (27.71) |
| K-factor | 0.124 | 0.147 |

*Not an example of this invention.

As can be seen from the results in Table I, the addition of a dialkanol tertiary amine provides substantial improvement in compressive strength, abrasion resistance, flowability and K-factor at an equivalent foam density.

EXAMPLE II

An active hydrogen containing composition is prepared by blending the following components:

| | Parts by weight |
|---|---|
| Voranol* 370[1] | 70 |
| Polyol XAS 10797[2] | 30 |
| Water | 2.5 |
| Surfactant[3] | 1.75 |
| dimethyl cyclohexyl amine | 2.70 |
| Dibutyltindilaurate | 0.08 |
| Freon 11[4] | 22% by weight of polyols plus polyisocyanate |
| methyldiethanolamine | 5.0 |

-continued

| | Parts by weight |
|---|---|
| Average functionality | 3.43 |

[1] A poly(propylene oxide) polyol having 6-7 functionalities and an equivalent weight of about 150.
[2] An experimental amine initiated polyol, tetrafunctional, 165 equivalent weight.
[3] A liquid organosilicone surfactant
[4] Trichloromonofluoromethane A polyurethane foam is prepared from this composition using the polyisocyanate and process described in Example 1. The resulting foam is tested as described in Example 1. The results obtained are reported as Sample No. 2 in Table II following.

For comparison, a active hydrogen containing composition (Sample No. C-2) is prepared which is the same in all respects except no dialkanol tertiary amine is used. The composition is foamed as in Sample No. 2. The properties of a foam prepared from Sample No. C-2 are reported in Table II.

TABLE II

| | Sample No. 2 | Sample No. C-2* |
|---|---|---|
| Density pcf (kg/m³) | 1.72 (27.55) | 1.67 (26.75) |
| Compressive strength psi (kPa) | | |
| perpendicular direction | 11.56 (79.70) | 9.56 (65.91) |
| parallel direction | 19.69 (135.76) | 19.63 (135.34) |
| Abrasion, wt loss % | 3.14 | 4.78 |
| Flowability, pcf (kg/m³) | 1.55 (24.83) | 1.68 (26.91) |
| K-factor | 0.136 | 0.141 |

*Not an example of this invention.

Again, improvement in K-factor, flowability, compressive strength and abrasion weight loss are seen when a dialkanol tertiary amine is present in the reaction mixture.

EXAMPLE III

Active hydrogen containing composition Sample Nos. III-1 to III-4 are each prepared from the following base formulation:

| | |
|---|---|
| Voranol 370[1] | 82.3 parts |
| P-1010[2] | 10.7 parts |
| Water | 3.0 |
| Surfactant[3] | 1.75 |
| Dimethylcyclohexyl amine | |
| Dibutyltindilaurate | 0.08 |
| Freon 11[4] | 23% by weight of polyols plus polyisocyanate |
| Dialkanol tertiary amine | |

[1] A poly(propylene oxide) polyol having 6-7 functionalities and an equivalent weight of about 150.
[2] A 1200 molecular weight polypropylene glycol.
[3] A liquid organosilicone surfactant.
[4] Trichloromonofluoromethane.

The amount and type of dialkanol amine employed in each of Sample Nos III-1 to III-4 are indicated in Table III. Each of Sample Nos. III-1 to III-IV are reacted with the polyisocyanate described in Example 1 at a 1.05 index. The flowability, density, compressive strength, abrasion loss and K factor are measured for each of the resulting foams, with results as indicated in Table III.

TABLE III

| Sample No. | III-1 | III-2 | III-3 | III-4 |
|---|---|---|---|---|
| Dialkanol tertiary amine type | phenyl diethanol amine | coco diethanol amine | o-tolyl diethanol amine | ethyl diethanol amine |
| Parts | 10.7 | 16.5 | 11.2 | 7.2 |
| Average Functionality, Isocyanate-reactive materials | 3.22 | 3.24 | 3.21 | 3.44 |
| Density pcf (kg/m³) | 1.72 (27.55) | 1.67 (26.75) | 1.75 (28.03) | 1.70 (27.23) |
| Compressive Strength, psi (kPA) | | | | |
| perpendicular direction | 13.1 (90.32) | 10.5 (72.39) | 11.7 (80.67) | 12.1 (83.43) |
| parallel direction | 19.4 (133.76) | 16.2 (111.70) | 18.9 (130.31) | 20.6 (142.03) |
| Abrasion wt loss (%) | 3.84 | 2.88 | 3.82 | 3.50 |
| Flowability pcf (kg/m³) | 1.55 (24.83) | 1.49 (23.87) | 1.52 (24.35) | 1.51 (24.19) |
| K-factor | 0.130 | 0.141 | 0.134 | 0.131 |

Excellent flowability, compressive strength and K-factor are seen in each of these foams, particularly when contrasted with the properties of Comparative Sample No. C-1.

EXAMPLE IV

This example illustrates the effect of functionality on shrinkage.

Comparative Foam Samples No. A and B, and Foam Sample No. IV prepared according to the general method described in Example 1, using the components disclosed in Table IV following.

TABLE IV

| | Parts by Weight | | |
|---|---|---|---|
| Component | Comp. Samp. No. A* | Comp. Samp. No. B* | Sample No. IV |
| Voranol* 370[1] | 67.50 | 73.80 | 76.95 |
| Polyglycol P-1200[2] | 15.85 | 9.50 | 10.00 |
| Methyldiethanol amine | 16.66 | 16.70 | 13.05 |
| Surfactant[3] | 1.75 | 1.75 | 1.75 |
| Dimethylcyclohexyl amine | 1.82 | 1.90 | 1.90 |
| Dibutyltin dilaurate | 0.08 | 0.04 | 0.04 |
| Freon 11[4] | 63.0 | 58.0 | 58.0 |
| Water | 3.0 | 3.0 | 3.0 |
| Polymeric MDI | 105 | 105 | 105 |
| Functionality[5] | 2.83 | 2.91 | 3.10 |

[1] A poly(propylene oxide) polyol having 6-7 functionalities and an equivalent weight of about 150.
[2] A 1200 molecular weight polypropylene glycol.
[3] A liquid organosilicone surfactant.
[4] Trichloromonofluoromethane.
[5] Average functionality of all isocyanate-reactive materials.

Properties of the resulting foams are evaluated as described in Example 1 and reported in Table V. Percent packing is calculated in each case by finding the minimum density foam which does not shrink at 0° C., subtracting the flowability, and dividing the difference by the flowability. A lower percent packing is preferred.

TABLE V

| Sample No. | A* | B* | IV |
|---|---|---|---|
| Compressive Strength psi (kPa) | | | |
| perpendicular direction | 13.3 (91.70) | 13.4 (92.39) | 12.2 (84.12) |
| parallel direction | 17.9 (123.42) | N.D. | 18.9 130.31 |
| K-factor | .130 | .130 | .127 |
| Flowability pcf (kg/m$^3$) | 1.34 (21.46) | 1.41 (22.59) | 1.41 (22.59) |
| % packing | 35% | 32% | 25% |

*Not an example of this invention
N.D. - not determined.

By comprising Sample No. IV with the comparative samples, it is seen that the higher average functionality of the isocyanate reactive materials provides a lower K factor and significantly less shrinkage, as indicated by the lower percent packing.

What is claimed is:

1. An active hydrogen containing composition comprising
   (a) at least one polyahl, which is not a dialkanol tertiary amine, having at least three active hydrogens per molecule
   (b) a minor amount of water, and
   (c) a dialkanol tertiary amine in an amount sufficient to improve the flowability of a foaming reaction mixture prepared from the active hydogen containing composition and a polyisocyanate from about 2 to about 40% compared to a like reaction mixture prepared in the absence of the dialkanol tertiary amine, wherein the isocyanate reactive materials in said active hydrogen containing composition have an average functionality of at least about 3.0.

2. The active hydrogen-containing composition of claim 1 further comprising an auxiliary blowing agent.

3. The active hydrogen-containing composition of claim 2 wherein the polyahl comprises a major portion of a low equivalent weight polyahl having an equivalent weight from about 50–300.

4. The active hydrogen-containing composition of claim 3 wherein the low equivalent weight polyahl contains at least 3 active hydrogens.

5. The active hydrogen-containing composition of claim 4 wherein the low equivalent weight polyahl is a polyol.

6. The active hydrogen-containing composition of claim 4 containing about 3–20 parts by weight of dialkanol tertiary amine per 100 parts polyahl.

7. The active hydrogen-containing composition of claim 2 wherein the dialkanol tertiary amine is an alkyl dialkanol amine.

8. The active hydrogen-containing composition of claim 7 wherein the dialkanol tertiary amine is methyl diethanol amine or ethyl diethanol amine.

9. The active hydrogen-containing composition of claim 8 wherein the dialkanol tertiary amine is an aralkyl dialkanol amine.

10. The active hydrogen-containing composition of claim 9 wherein the aralkyldialkanol amine is benzyl diethanol amine.

11. In a process for preparing a polyurethane foam comprising reacting a polyahl and a polyisocyanate in the presence of water whereby a polyurethane foam is obtained, the improvement comprising conducting said reaction in the presence of a dialkanol tertiary amine in an amount sufficient to improve the flowability of the foaming reacting polyahl and polyisocyanat from about 2 to about 40% compared to a like reaction mixture prepared in the absence of the dialkanol tertiary amine, and wherein the average functionality of all isocyanate-reactive materials employed in said reaction is at least about 3.0.

12. The process of claim 11 wherein said reaction is conducted in the presence of an auxiliary blowing agent.

13. The process of claim 12 whereby said polyisocyante and said polyahl are selected such that a rigid foam is obtained.

14. The process of claim 13 wherein said reaction is conducted in the presence of about 3-20 parts by weight of dialkanol tertiary amine per 100 parts by weight polyahl.

15. The process of claim 13 wherein the dialkanol tertiary amine is an alkyl dialkanol amine.

16. The process of claim 15 wherein the alkyldialkanol amine is methyl diethanol amine or ethyl diethanol amine.

17. The process of claim 13 wherein the dialkanol tertiary amine is benzyl diethanol amine or o-tolyldiethanol amine.

* * * * *